May 3, 1955 W. C. LILLIENDAHL ET AL 2,707,679
METHODS OF PRODUCING ZIRCONIUM AND TITANIUM
Filed Jan. 4, 1951
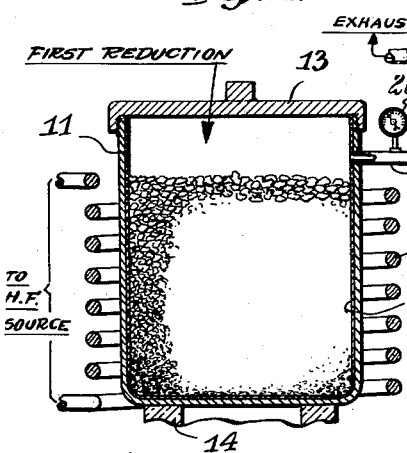
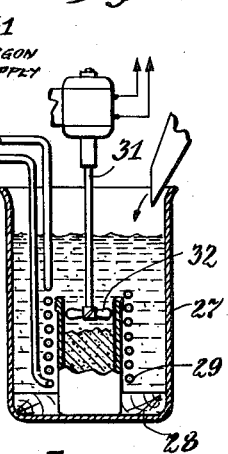
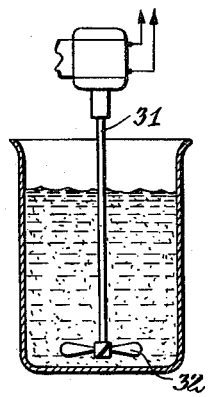
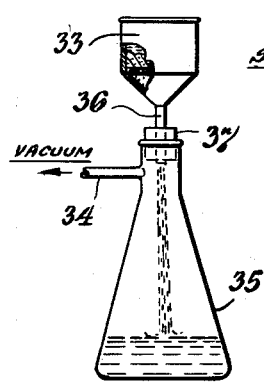
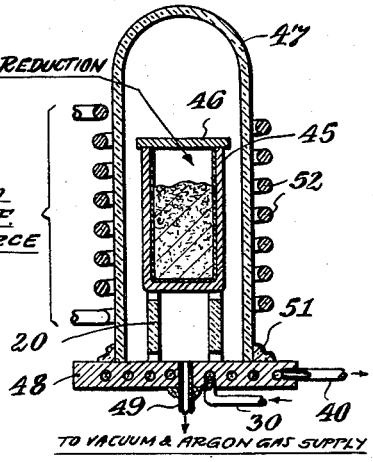
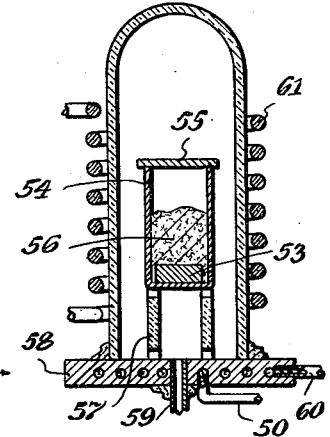
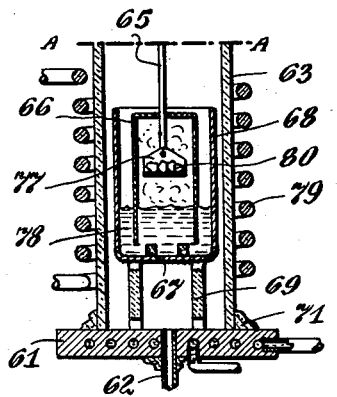
INVENTORS
W. C. LILLIENDAHL
E. GREGORY.
BY
ATTORNEY United States Patent Office 2,707,679
Patented May 3, 1955

2,707,679

METHODS OF PRODUCING ZIRCONIUM AND TITANIUM

William C. Lilliendahl, Mountain Lakes, and Edward Gregory, Essex County, N. J., assignors to Westinghouse Electric Corporation, East Pittsburgh, Pa., a corporation of Pennsylvania Application January 4, 1951, Serial No. 204,386

7 Claims. (Cl. 75—84)

This invention relates to refractory metals of Group IV, more particularly to the production of zirconium and titanium of an exceptionally high degree of purity and softness, and to an improved method for the manufacture thereof.

The principal object of our invention, generally considered, is to produce zirconium and titanium by a double reaction of a compound thereof with magnesium and calcium, said reactions respectively taking place in a container and in a cup enclosed in a container, said containers being filled with an inert gas; as distinguished from the prior practice of reducing the oxide in a heavy-walled iron bomb with a ground-in stopper, said bomb being heated in open air, the metal after consolidation of the powder so produced being heated in calcium to effect softening Another object of our invention is to produce, by multiple reduction, zirconium and titanium, each in the form of powders, by heating compounds of said metals mixed with magnesium, calcium and calcium chloride by high-frequency induction, the reaction cup of the final reduction being enclosed in a quartz or high-silica glass bell jar, such as one of 96% silica glass.

A further object of our invention is to treat the powder, produced in accordance with the above, to consolidate it into coherent metal, form to the desired shape, and soften by soaking in molten calcium or its vapor.

Other objects and advantages of the invention will become apparent as the description proceeds.

Referring to the drawing:

Fig. 1 is a sectional view of apparatus for performing the first reduction in producing refractory metal in powder form;

Fig. 2 is a vertical sectional view of apparatus for leaching the contents of the cup used in the reduction of a refractory metal compound, to remove the metal powder produced therein and dissolve soluble salts formed in the reaction;

Fig. 3 is a vertical sectional view of apparatus for washing the refractory metal powder produced;

Fig. 4 is an elevational view of apparatus, with parts in vertical section, illustrating how the product may be washed and dried;

Fig. 5 is a vertical sectional view, with parts in elevation, of apparatus for performing the final reduction in producing refractory metal powder;

Fig. 6 is a vertical sectional view of apparatus for treating compact ingots of refractory metal produced from the initial powder, in order to soften them by removing dissolved oxygen therefrom;

Fig. 7 is a fragmentary vertical sectional view of apparatus for either treating slugs of refractory metal, such as produced by apparatus, shown in Figs. 1 to 5, inclusive, in calcium vapor, or purifying molten calcium by means of scrap refractory metal;

Fig. 8 is a fragmentary vertical sectional view of apparatus which may be alternatively employed for purifying calcium;

Fig. 9 is a vertical sectional view of the portion of the apparatus of Fig. 7 and Fig. 8, above the lines A—A thereof.

The reduction of rare metal oxides, including zirconium and titanium oxide, by calcium or other reducing agents, has previously been accomplished in heavy-walled iron bombs, with a ground-in stopper held in place by a screw cap. Such devices have a number of limitations and disadvantages, to wit:

It is difficult to maintain an air-tight joint between the stopper and bomb and to prevent reoxidation of the rare metal powder produced as the bomb cools, or during the heating process. Considerable warping of the bomb occurs during heating and cooling, thus necessitating time-consuming lapping operations between runs. The construction of bombs has been limited to materials which will resist oxidation at elevated temperatures, and iron or iron alloys have been generally used for economy. Bombs were without exception of heavy-walled construction to permit sufficient surface area for sealing and presumably to withstand pressure produced in the reaction.

From thermo-chemical data and a consideration of the products formed in the reaction between rare metal oxides and calcium, we concluded that the pressures developed in the reaction were insufficient to necessitate the heavy-walled bombs previously used. We tested our conclusions by placing an iron cup under a high-silica glass (or quartz) bell jar, evacuating the bell jar, and then heating the iron cup by high frequency induction to cause the calcium to reduce the oxide. Vaporization of the calcium was suppressed by filling the jar with argon gas at a pressure slightly less than atmospheric. There was no abnormal pressure produced during the reaction, very little vaporization of calcium, and a satisfactory metal powder was obtained.

The reduction of rare metal oxides by calcium is very old in the prior art. However, zirconium so produced, when pressed and sintered, resulted in hard and brittle metal compacts. Furthermore, such pressed compacts could not be properly consolidated because of puffing and swelling, apparently due to excess calcium. This result has been due to the non-recognition of the importance of controlling both the amount of calcium present and the temperature of the reaction during reduction, as embodied in the copending application of joint applicant Lilliendahl and H. C. Rentschler, Serial No. 712,408, now Patent No. 2,537,068, dated Jan. 9, 1951, and the present specification, that is, using about 100% reducing metal in excess over the theoretical required in the reaction, together with calcium chloride to control localized high-temperatures during the reaction.

The invention to be disclosed, therefore, differs from prior practice in the following respects and obviates several limitations of former practice. The heating, reaction, and cooling of the charge are carried out under known, controlled and reproducible conditions of gas filling and exhaust. The reaction is carried out in a vessel or cup of relatively thin wall. Oxidation of the cup and product is entirely prevented by working in an atmosphere free of oxygen. A choice of several materials of construction for the cup may be made, the only limitation being the melting point and chemical activity of the material with the refractory metals, such as zirconium and titanium, and calcium at elevated temperatures.

Specifically, the invention relates to the preparation of non-pyrophoric rare metal powder of a high degree of purity, to the pressing or pressing and sintering of such powder into articles of the desired size and shape, and to the subsequent softening thereof by removal of residual dissolved oxygen.

In general, the method involves reduction of a compound such as the oxide, first with mainly a relatively cheap but inefficient reducing metal, such as magnesium, and then reducing the remaining rare metal oxide with mainly calcium under controlled conditions of exhaust and gas filling with an inert gas such as argon. After reduction, the metallic rare metal in power form is recovered by leaching the charge with dilute acid, water, and the powder is finally washed with alcohol, ether, and dried in vacuo. Articles are then formed from the powder by pressing, sintering or melting, working and/or machining to the final form desired. The advantages of the method will become apparent as the description proceeds.

The present invention to be described, therefore, includes the reduction and washing techniques of the previous application referred to, but differs essentially therefrom in the use of a double reduction. The first reduction is a partial reduction of zirconium and titanium oxides mainly with magnesium and this is followed by a second reduction mainly with calcium, based upon the unreduced zirconium oxide, or titanium oxide, remaining from the first reduction.

This method of procedure has produced a superior product with respect to oxygen contamination and is considerably cheaper because of the large differential in cost between calcium and magnesium. It is also more adaptable to large scale production.

The difficulties involved in the metallurgy of such metals are chiefly those of controlling both the oxygen and nitrogen content thereof. Gaseous contaminations are related to completeness of reduction, contamination of raw materials, and the pick-up of these gases from the air during processing. For example, certain grades of calcium are unsuitable because of high nitrogen content, which may be reduced as later explained. The nitrogen content of distilled magnesium is low, generally less than 0.005%, while the better grades of distilled calcium show approximately 0.02% N. Magnesium, however, does not completely reduce zirconium oxide and titanium oxide, the reaction with 100% excess magnesium yielding a product containing nearly 50% oxide content. In the methods to be described, these difficulties are overcome by a suitable compromise.

The oxide if first desirably reduced with magnesium in an iron cup at 1000° C. for 30 minutes under an atmosphere of 99.7% argon gas. Contamination of the charge with iron is avoided by lining the reduction vessel with a layer of calcium oxide or magnesium oxide. Calcium chloride is added as a flux to control the temperature within the charge. The charge is then leached with water and dilute acid to remove the end products as magnesium, calcium chloride, and magnesium oxide and the partially reduced zirconium is washed by decantation with water, filtered off and dried in vacuo.

This product is then mixed with calcium and calcium chloride and re-reduced at 1000° C. for 30 minutes under specified conditions.

Typical charges for reduction are as follows:

EXAMPLE #1

*First reduction*

|  | Parts by Weight | Moles |
| --- | --- | --- |
| $ZrO_2$ | 123.22 | 1 |
| Mg | 97.28 (100% excess) | 4 |
| $CaCl_2$ (dehydrated) | 123.22 |  |

Assuming 50% mole reduction, the reagents required for the product of the first reduction, that is $Zr+ZrO_2$, are as follows:

*Second reduction*

|  | Parts by Weight | Moles |
| --- | --- | --- |
| $Zr+ZrO_2$ | 107.22 | 1/2 ($ZrO_2$). |
| Ca | 80.16 (100% excess) | 2. |
| $CaCl_2$ (dehydrated) | 61.61 |  |

The values for $CaCl_2$ are the result of experience in determining a proper fluidity of the charge.

EXAMPLE #2

*First reduction*

|  | Parts by Weight | Moles |
| --- | --- | --- |
| $TiO_2$ | 79.9 | 1 |
| Mg | 97.28 (100% excess) | 4 |
| $CaCl_2$ (dehydrated) | 79.9 |  |

Assuming 50% mole reduction, the reagents required for the product of the first reduction, that is, $Ti+TiO_2$, are as follows:

*Second reduction*

|  | Parts by Weight | Moles |
| --- | --- | --- |
| $Ti+TiO_2$ | 63.9 | 1/2 ($TiO_2$). |
| Ca | 80.16 (100% excess) | 2. |
| $CaCl_2$ (dehydrated) | 39.95 |  |

The reactions taking place may be expressed by the following equations:

1. $ZrO_2+2Mg \rightarrow Zr+2MgO$
2. $ZrO_2+2Ca \rightarrow Zr+2CaO$
3. $TiO_2+2Mg \rightarrow Ti+2MgO$
4. $TiO_2+2Ca \rightarrow Ti+2CaO$ In practice it has been found desirable to use 100% excess magnesium in the first reduction and an amount of calcium chloride corresponding to the weight of oxide taken for reduction.

The product from the first reduction is analyzed for rare metal content by determining the oxygen taken up on conversion to oxide, from which the per cent rare metal and oxide in the mixture may be calculated.

The calcium used in the second reduction is based on a 100% excess above that theoretically required to reduce completely the unreduced rare metal in the product from the first reduction.

A production of zirconium in a single reduction using 100% excess calcium is described in the copending application referred to. The substitution of magnesium in the first reduction as described above results in a saving of approximately 60% of calcium, and furthermore reduces the nitrogen content of the resulting product because of the relatively low nitrogen content of magnesium as compared to calcium.

Of course all these ratios of magnesium to oxide and amount of calcium chloride used may be varied appreciably without materially affecting the results obtained, but the ratios given are the preferred ratios.

In adapting the double reduction process to large scale production, it is possible that rather crude equipment could be used, such as a large steel vessel with an airtight cover, through which argon gas is passed in a continuous stream during reduction, as the prime consideration here is the exclusion of nitrogen and not the complete conversion of oxide to metal. The second reduction could then be performed in specially designed equipment such as referred to in prior applications. Because of the relatively high density of the product obtained by the first reduction, the equipment used for the second reduction would be relatively small per unit charge.

Magnesium chloride could be substituted for calcium chloride in the first reduction. The reaction in this case proceeds farther towards completion, but the contamination of the product with iron is somewhat higher because of the liberation of some hydrogen chloride during the reduction.

In practice we prefer to reduce the oxide of the desired metal, because it is not hygroscopic and has an extremely low vapor pressure at the temperature of the reaction, although other compounds, enumerated in said copending application, may be used. In producing zirconium powder, oxides of sufficient purity may be occasionally purchased, although most oxides contain a rather high percentage of silica and are without exception very voluminous. The low density of these oxides reduces to a marked degree the weight of zirconium powder obtained per unit charge. In view of these difficulties, we may resort to special purification methods, although oxides of low apparent density may be converted to those of high apparent density by igniting for from about five to ten hours in air.

We have discovered that a very dense oxide may be prepared by ignition of zirconyl chloride, and the crystallization of this compound serves as an adequate purification step, in most cases, as described in said copending application.

In Patent No. 2,446,062, dated July 27, 1948, Manufacture of Thorium, details are presented for the production of metal powder by mixing thorium oxide and calcium, placing the charge in a molybdenum container, and heating said container to a sufficiently high temperature to cause reduction of the oxide to metal. The heating is with a high-frequency coil, the container is hermetically sealed with a high silica glass jar closed at one end, and the reduction takes place in an inert gas such as argon under controlled pressure. The apparatus used for zirconium reduction is identical with that used for thorium, with certain modifications with respect to the charge which will now be discussed.

Attempts to prepare zirconium by the method used for thorium result in a non-pyrophoric powder which is relatively coarse. Powder produced by calcium and zirconium oxide alone analyzed from 0.20% to 1.0% calcium, the calcium content of the metal powder falling off as the excess of calcium over that theoretically required was increased. With as high as 300% excess calcium, metal powder containing 0.2% calcium was obtained.

While the presence of calcium may or may not be objectionable as an impurity, it has an important bearing on the fabrication of special shapes by sintering. This is true since it has been found that the greater part of this calcium is not liberated until temperatures of over 1500° C. are attained. At these temperatures and higher the liberation of calcium causes severe blistering and low density in the treated article. This appears to be due to the high vapor pressure of the calcium and the plasticity of the metal at high temperatures. It is not known at the present time whether this calcium is present in the form of a metallic compound with zirconium, or an oxygen-bearing compound with zirconium.

The reaction between magnesium or calcium and zirconium oxide is very exothermic, and since increasing the excess reducing metal in the charge reduced the residual impurity in the powder obtained, it became apparent that the amount of reducing metal might be controlled by diluting the charge with inert material which would increase the fluidity of the charge and reduce the formation of localized high temperature centers.

It was found that this could be accomplished by the addition of carefully dehydrated calcium chloride to the charge of oxide and calcium. By diluting the charge in this manner we have been able to produce consistently a non-pyrophoric zirconium powder which contains not more than between 0.05% and 0.09% calcium. This residual amount of reducing metal has been found to exert no detrimental effect during the sintering process and permits the formation of a dense coherent metal.

In Fig. 1 there is shown apparatus for effecting the reduction of a rare metal oxide to metal. This involves a container, cup or crucible 11 formed of a suitable metal, relatively inert to the charge and product at elevated temperatures, preferably iron lined with CaO or MgO 12, and provided with an air-tight cover 13. The cup preferably rests on a hollow refractory insulator 14. A mixture of zirconium oxide of high purity, as specified above, and ground to pass a 100 mesh sieve, distilled magnesium of highest purity obtainable cut to pass ⅛" wire screening, and dehydrated calcium chloride, which should not contain over .5% water, ground to a powder, is placed in the cup. A preferred mixture previously described, which represents an excess of approximately 100% Mg. over that theoretically required, in accordance with the Equation 1, is employed. Dehydration of the calcium chloride is necessary because ordinary dehydrated calcium chloride, as purchased yields variable results. The presence of water vapor plays an important role in increasing the reaction rate, temperature, and residual magnesium content of the metal, apparently acting as a catalyst. This proportion is preferred, although satisfactory metal has been produced with between 50% and 300% excess of magnesium.

The charge is milled for 30 minutes by tumbling to obtain a good mix and then poured into the reduction container. The container 11 is now closed by cover 13 of the same or a suitable metal. The container 11 is tubulated, as indicated at 15, and connected, as through three-way valve 21, to an exhaust system which may conveniently be comprised of a high vacuum pump, or mercury diffusion pump, and a liquid air trap, such as illustrated in Fig. 1 of the Patent No. 2,446,062. The cup is then exhausted to a high vacuum, about 50 microns, through said valve, a Geissler tube desirably serving to indicate the degree of exhaust obtained, as illustrated in said figure.

Argon gas (99.7%) is then introduced, as from a tank through valve 21 to a pressure of slightly above atmospheric, in order to avoid any leakage of air thereinto. A gage 20 may indicate this pressure. The metal cup 11 is then slowly heated, preferably by induction, to about 1000° C. and maintained at that temperature for about 30 minutes, as by energizing a high-frequency coil 23 disposed therearound, as shown in Fig. 1, to melt the magnesium and calcium chloride and partially reduce the rare metal oxide to metal powder.

After the cup and charge have thoroughly cooled at the end of the reaction, the cup is placed in a jar or receptacle 27 containing cold water. While in the receptacle 27, the cup 11 is preferably centered, as by means of a block of wood 28, and cooled during the process of leaching as by means of a coil of pipe 29, preferably formed of stainless steel, through which water circulates. Hydrochloric or acetic acid is added at this stage in slight excess over that sufficient to dissolve any unreacted magnesium and its oxide, which, with the chloride, is leached out of the cup. The mixture is preferably stirred as by means of a stainless steel motor-driven stirrer 31 provided with propeller 32.

After leaching in this manner, so that the metal powder is out of the cup, the empty cup and cooling coil are removed and the liquid stirred, as in Fig. 3, to assist in the solution of all but the produced rare metal powder and any of its unreduced oxide. After settling for about one half hour, the supernatant liquid is syphoned off.

The metal powder and unreduced oxide is then washed with dilute hydrochloric or acetic acid, formed by mixing one part of the concentrated acid with ten parts of water by volume, for one hour with constant agitation. After settling until almost clear, the acid is syphoned off and the powder and its oxide washed in the same way with water, until a sample of the wash liquor shows less than 0.001 gm. of magnesium per 100 ml. This generally requires about 6 washes, 5 liters solution per wash for 100 gms. of rare metal powder, and oxide. After the last wash, the powder and oxide are filtered as in a Buchner funnel 33, illustrated in Fig. 4, using suction as applied to tube 34 of flask 35. A relatively coarse filter paper is preferably used in the funnel, the tubulation 36 of which passes through a cork 37 in the neck of flask 35.

The metal powder and its oxide, after removal from the Buchner funnel, is dried in a spherical flask 38, such as illustrated in Fig. 5 of Patent No. 2,446,062, having a neck 39 receiving a cork 41 through which tubes 42 and 43 pass, one of said tubes being connected to a vacuum pump. Such an arrangement permits the powder to be dried under vacuum conditions. The complete removal of moisture is obtained by immersing the flask with the vacuum on in water 44 at 60° C. to 70° C. and shaking the flask intermittently until such removal is noted by the absence of dusting upon shaking. For larger production a steam jacketed vacuum oven would be used.

Metal powder and its oxide, desirably prepared as outlined above, is mixed with calcium and calcium chloride, in preparation for the second reduction in accordance with previous brief description, and placed in a cup or container 45, (Fig. 5) which may be smaller than the cup 11 (Fig. 1) because the material placed therein is smaller in bulk.

However, apparatus such as illustrated in Fig. 5, of appropriate size, and/or another method of heating including a resistance or gas-fired furnace, may alternatively be used for the first reduction.

The container 45, which may be formed of iron (desirably lined with CaO or MgO except where the charge is pelleted as later described), is now covered as by a plate 46 of the same or a suitable metal. The container is placed under the high-silica glass bell jar 47, while supported on a hollow refractory insulator 20 resting on a plate 48. The metal plate 48 is preferably cooled by circulating water therethrough by means of inlet pipe 30 and outlet pipe 40. It is tubulated, as indicated at 49, and connected to an exhaust system which may conveniently comprise a high vacuum pump or mercury diffusion pump and a liquid air trap, such as represented by the character 17 in Patent No. 2,446,062, previously referred to. The bell jar 47, (Fig. 5) is desirably just large enough to slip over the cup 45. It is set on the metal base 48 and sealed vacuum tight preferably by means of vacuum wax 51. The jar is then exhausted to a high vacuum, about 50 microns, through a valve or stop cock (Fig. 1, Pat. 2,446,062), a Geissler tube serving to indicate the degree of exhaust obtained, all as illustrated in said patent.

Argon gas (99.7%) is then introduced, as from a tank, to a pressure of about ¾ of an atmosphere. A mercury column may indicate this pressure. A gas trap or blowoff, comprising a mercury column also may be provided, as disclosed in said patent. The metal cup 45 (Fig. 5), is then slowly heated to about 1000° C. and maintained at that temperature for about 30 minutes by energizing the coil 52 to melt the calcium and calcium chloride and complete the reduction of the rare metal oxide to metal powder. During this period of heating, some changes in pressure occur and it is advisable to maintain a positive pressure on the bell jar 47 by pumping off sufficient gas from time to time to hold the final pressure to about ¾ of an atmosphere.

After the cup 45 and charge have thoroughly cooled at the end of the reaction, the cup is removed and placed in a jar or receptacle and leached, as in connection with the product of the first reduction. Apparatus such as shown in Figs. 2, 3 and 4 may be employed and the description in connection with the first reduction followed.

We also contemplate a double reduction of rare metals using an alloy of calcium and magnesium for the first reduction, the magnesium being in large excess, followed by a second reduction with an alloy of calcium and magnesium, the calcium being in large excess.

Calcium chloride is used in the first reduction to prevent excessive temperatures within the charge, but omitted in the second reduction since this has been found possible without introducing excessive calcium into the product.

From the equilibrium diagram of calcium and magnesium alloys (see Hansen, Der Aufbau der Zwerstofflegierungen, p. 399) calcium and magnesium form two eutectics about 21.5% Mg, 79.5% Ca (by weight) and about 82% Mg, 18% Ca (by weight) whose melting points are approximately 450° C. and 520° C., respectively.

Because of the melting points and resulting fluidity imparted to the charge, these eutectic compositions were chosen as the preferred mixtures, although it is apparent that some departure from the composition could be employed within the scope of the invention.

The extent of reduction, in either reduction, depends on the excess of reducing agents over theoretical, particularly calcium which is superior to magnesium as a reducing agent for oxides. It has been found possible to obtain a good product by using a total quantity of reducing agents of 5 moles Ca+Mg eutectics. This represents an appreciable reduction in the amount of Ca+Mg (6 moles) used as described in the preceding embodiment. This may be shown from quantities per mole of $ZrO_2$.

A typical charge for the first reduction, using 82% Mg, 18% Ca, eutectic, is as follows:

| | Parts by Weight | Moles |
|---|---|---|
| $ZrO_2$ (or same mole proportion of $TiO_2$) | 123.22 | 1 |
| Mg | 64.50 ⎫ (50% excess) | 2.65 |
| Ca | 14.02 ⎭ | .35 |
| $CaCl_2$ | 123.22 | |

Assuming 50% mole reduction, the reagents required for the product of the second reduction, that is $Zr+ZrO_2$, using 21.5 Mg, 78.5% Ca, eutectic are as follows:

| | Parts by weight | Moles |
|---|---|---|
| $Zr+ZrO_2$ (or $Ti+TiO_2$ of comparable mole proportion). | 107.22 gms | ½ ($ZrO_2$). |
| Mg | 15.08 ⎫ (100% excess) | .62 |
| Ca | 55.3 ⎭ | 1.38. |

The ratio of moles in 1st and 2nd reductions are chosen based on quantities required to give a good mix, rather than on theoretical basis of unreduced $ZrO_2$ in product from 1st reduction.

It will be noted that the reductions involve a total of 1.73 moles Ca and a total of 5 moles Ca+Mg. This compares with 4.0 moles calcium, when calcium alone is used, and 2 moles of Ca or a total of 6 moles Ca+Mg in reductions involving a first reduction with magnesium followed by a second with Ca. However, even in the latter instance, good results are obtainable using only 50% to less than 100% excess magnesium for the first reduction.

Using the eutectic for the first reduction, even though the theoretical excess is less than that of the first embodiment, and even when proceeding in accordance with the first embodiment, the reaction proceeds sufficiently far to permit the elimination of calcium chloride in the final reduction, that is, the remaining free energy is sufficiently low to hold the reaction down to the ambient temperature of the charge. Otherwise, the details of the process, using the apparatus previously described, may be in accordance with the first embodiment.

In addition to the use of the calcium-magnesium eutectics shown above, we have made other innovations which have contributed to operating economics and increased purity of the final product.

If zirconium powder is produced in an iron, molybdenum or molybdenum-lined iron cup, it is impossible to prevent some contamination of the charge with one or both of these metals which is alloyed with the powder and not removed by acid washing. The amount of contamination is a function of both time and temperature of reduction, and may amount to 0.1–0.4% or more, depending on conditions.

If an iron container is used, as preferred and illustrated in Fig. 1, it has been found that iron contamination may be completely eliminated in the first reduction by lining the container, bottom, and sides, with pure calcium oxide or magnesium oxide. This may be accomplished by inserting a concentric tube of thin wall section, approximately ¼" smaller in outside diameter than the inside diameter of the reaction cup. A layer of the selected oxide is placed in the bottom of the cup, the tube inserted, the annular space filled with the oxide, and the center with the reaction mix. The tube is then withdrawn leaving a layer of oxide between the container and the charge.

The charge may then be compacted about ¼ of its bulk, preferably by hydraulic pressure, using a steel plunger and a thin layer of calcium or eutectic placed on top of the charge. This pressing operation permits approximately 25% more material to be charged into a given container and also produces a more intimate contact between the reactants.

There is some possibility of a reversal of the reaction to some extent because of the presence of excess CaO if the temperature is too high, but this is not critical, since it will be overcome in the second reduction.

After the product from the first reduction has been leached with acid, as previously disclosed, the resulting zirconium powder plus unreduced oxide is mixed with the 21.5 Mg, 78.5 Ca, eutectic, and may then be pressed into pellets in a steel die, or the powder may be pelleted in a Stokes press, if desired. This pellet pressing operation serves to decrease intimate contact with the walls of the iron container and also to increase contact between reactants. Calcium oxide is omitted in the second reduction because of possible equilibrium reversal.

At the completion of the run, the charge is leached with acid and water, as previously disclosed. The actual operation of reduction is fundamentally the same as that described in connection with the first embodiment. It has been found that heating for approximately 30 minutes at 900°–950° C. under a pressure of argon gas of ¾–1 atmosphere is sufficient to drive the reaction to completion.

Metal powder prepared as outlined above may be pressed into coherent buttons, rods, strips or other forms, in steel dies under hydraulic pressure, that is, by placing in a die and employing a hydraulically-actuated plunger to effect the desired consolidation. As an alternative, the power may be placed in a rubber or other flexible mold and immersed in a liquid which is subjected to the desired pressure.

Such articles pressed from zirconius or titanium powder may be sintered into parts of high density by heating in vacuum, helium or argon up to 1450° C. for from about four to five hours. If in a noble gas, the pressure is preferably slightly in excess of atmospheric. For this operation we have found that high quality porcelain tube furnaces may be used. Pressed bars or other shapes may be placed on a layer of thoria in a molybdenum boat, the whole inserted into the tube furnace. The furnace is then exhausted to a good vacuum and the temperature gradually raised to 1450° C. and held at this point for at least three hours and then slowly cooled to room temperature. If the metal is to be sintered in a noble gas, such as helium or argon, it is preferable that it be first sintered in a high vacuum of about $10^{-3}$ microns or better, to about 1000° C. for about ten to twelve hours to eliminate residual hydrogen and some free calcium. Purified helium or argon is then introduced desirably to a slight excess of atmospheric pressure, and the temperature then raised to between 1300 and 1450° C. and there maintained for from about four to five hours.

If sintered at 1000° C. in a vacuum, the bars may rest on molybdenum metal, at which temperature no alloying occurs. Satisfactory metal may be produced by such sintering for 12 to 14 hours.

We have also found that zirconium may be sintered to at least 1400° C. in contact with tantalum, as no appreciable alloying was found to occur at such at temperature. Either sintered or melted zirconium shows some cold malleability, toughness, and lack of brittleness usually encountered with such material produced by methods in use other than the iodide process. The material can be worked at room temperature but the hardness drops considerably at 300° C. Wire and sheet have been rolled at temperatures between 300° and 600° C. The melted or sintered material is easily machined, drilled and tapped using high speed tools. This fact alone illustrates the strength and toughness of the metal produced and also extends its adaptability to many problems where special shapes are required. We have found that zirconium metal produced by sintering as above described has a Vickers No. of 183.

The physical properties, particularly hardness and loss of ductility of coherent metal, produced from compacts made from powdered zirconium and titanium, are directly related to their oxygen and nitrogen content. As an illustration, zirconium made by the iodide process is very soft, ductile, and contains only approximately .001 to .003% nitrogen and .01 to 0.3% oxygen, by weight. With increasing content of oxygen, nitrogen, or both, the hardness of the metal increases and the ductility falls off rapidly until, with .2% or more oxygen, the metal becomes very difficult to fabricate and is hard and brittle in the annealed state. Heretofore, no satisfactory method has been discovered for removing or materially reducing the oxygen or nitrogen content of zirconium or titanium.

It is known that oxygen is in a somewhat mobile condition in these metals, as it has been demonstrated on very fine wires that it is possible to cause migration of the oxygen contained in a wire, when a undirectional potential is applied to said wire. Wires treated in this manner at elevated temperatures show a hardness gradient from one end to the other as the electrolysis proceeds.

We have discovered that the oxygen content and the resulting hardness of such metals may be substantially reduced by treating the metal in the solid pressed state by calcium vapor at elevated temperatures or in molten nitrogen-free calcium. It has been found that three hours at 1000° to 1300° C. in an argon atmosphere saturated with calcium, or the same length of time in molten calcium, appreciably reduced the hardness of zirconium which was embrittled by oxygen. In neither method was the residual calcium content of the metal increased, but the hardness was in all cases appreciably lower. The process was tried on pure zirconium doped with known amounts of oxygen and also on commercial grades with similar results.

Following the analytical proof of oxygen removal from zirconium the process was further studied with the objectives of determining the effect of time and temperature on the rate of oxygen removal. An attempt was also made to establish the ultimate oxygen-zirconium equilibrium as a function of time and temperature of treating.

In view of the fact that in a practical application of this process to oxygen removal it seemed improbable that samples containing over 0.5% oxygen by weight need be considered, a number of pieces of (Foote) 0.125" diameter rod were doped with oxygen in the range of 0.02–0.46%. The samples were cut in half and one part of each analyzed for oxygen. The remaining halves were then soaked in molten calcium under the following conditions. (1) 5 hours at 1000° C (2) 1 hour at 1000° C and (3) 4 hours at 1300° C. The average range of oxygen concentrations was covered for each treatment. The samples were then analyzed for oxygen. The data are reproduced and shown in Table I.

TABLE I.—OXYGEN REMOVAL BY MOLTEN CALCIUM SOAKING

| Sample | Treatment | | Oxygen Content | | Fraction Removed |
| --- | --- | --- | --- | --- | --- |
| | Temp., °C. | Time/hrs. | Wt. Percent | | |
| | | | Original | Final | |
| 1 | 1,000 | 5 | 0.06 | 0.02 | 0.67 |
| 2 | 1,000 | 5 | 0.08 | 0.02 | 0.75 |
| 3 | 1,000 | 5 | 0.28 | 0.02 | 0.93 |
| 4 | 1,000 | 5 | 0.46 | 0.15 | 0.67 |
| 5 | 1,300 | 1 | 0.07 | 0.02 | 0.71 |
| 6 | 1,300 | 1 | 0.14 | 0.03 | 0.79 |
| 7 | 1,300 | 1 | 0.20 | 0.02 | 0.90 |
| 8 | 1,300 | 1 | 0.37 | 0.08 | 0.78 |
| 9 | 1,300 | 4 | 0.02 | 0.02 | |
| 10 | 1,300 | 4 | 0.34 | 0.02 | 0.91 |
| 11 | 1,300 | 4 | 0.45 | 0.07 | 0.845 |

The data in Table I indicate that oxygen in the range of 0.02–0.25% is removed from zirconium to a residual value of approximately 0.02% by calcium soaking for 5 hrs. at 1000° C. or for 1 hour at 1300° C.

Sample 9 suggests that the limiting oxygen equilibrium concentration in the metal is approximately 0.02%, since four hours at 1300° C. did not appreciably change this lower figure. It appears feasible to reduce the oxygen content of zirconium containing 0.5% or more oxygen to this limiting value. The treating time would of course be of the order of five to six hours at 1300° C. to reach the minimum.

For treatment in molten calcium apparatus such as illustrated in Fig. 6 may be used. Here the reference character 53 designates a pressed slug or other article formed from zirconium or titanium powder. This is placed in a container 54, desirably formed from molybdenum or iron lined with tantalum, covered by a plate 55, after placing in said container a quantity of metallic calcium 56, desirably as pure as can be obtained, especially with respect to nitrogen. This container is supported on a hollow refractory insulator 57 which, in turn, rests on a plate 58 through which cooling water is circulated by means of pipes 59 and 60, as in connection with the plate 58 of Fig. 5. The plate 58 is tabulated, as indicated at 59, and connected to a high vacuum exhaust system, such as employed in connection with the apparatus of Fig. 5. After exhausting, it is filled with argon gas like the apparatus of Fig. 5.

The calcium 56 is then melted, as for example, by a high frequency oscillator connected to a surrounding coil 61, to between 1000° and 1300° C. and held at that temperature for 2 or 3 hours. Specific examples are, soaking for about 5 hours at about 1000° C. or about 1 hour at about 1300° C. The cup is then cooled, and the slug or pieces 53 of rare metal separated from the calcium matrix by leaching with dilute hydrochloric or acetic acid, as in accordance with the removal of the zirconium powder from its reducing metal and associated material previously described. The following table shows the results of such treatment:

TABLE II.—EFFECT OF Ca SOAKING ON HARDNESS OF ZIRCONIUM

| Sample | V. P. N. before Treating | V. P. N. after Treating | Drop V. P. N. |
| --- | --- | --- | --- |
| 1 | 230 | 115 | 115 |
| 2 | 230 | 157 | 73 |
| 3 | 188 | 136 | 52 |
| Avg. | 216 | 136 | 80 |

The final average hardness of this material is approximately about 35 V. P. N. above iodide zirconium. This residual hardness is probably the result of nitrogen contamination of the metal which is obviously not removed in the treatment.

It appears from investigations, that the mobility of oxygen in different metals is not the same, that in some cases high temperatures of operation are desirable. For operating at temperatures in excess of 1000° C., it is desirable to substitute a molybdenum or tantalum cup, or a molybdendum cup lined with tantalum, for iron, to avoid possible alloying action between the rare metal to be treated and the cup.

Referring now to the apparatus illustrated in Figs. 7 through 9, there is shown, as in Figs. 5 and 6, a metal plate 61, tubulated as indicated at 62, and connected to a high vacuum exhaust system by means of said tubulation. A preferably 96% silica bell jar 63 is employed, as in Figs. 5 and 6, except that in this instance the top of said jar has an extension 64 apertured to allow for sliding a rod 65 therethrough. The lower end of said rod 56 passes through an aperture in an inverted hollow cylindrical member 66, desirably formed of refractory metal like the container 54 of Fig. 6, the lower edge of which rests on a hollow refractory insulator 67 which is, in turn, supported on the bottom of the cup or crucible 68. The crucible 68 rests on a refractory insulator support 69, which is, in turn, supported on the metal plate 61. Means for cooling said plate is desirably provided as in Figs. 5 and 6. The lower edge of the bell jar 63 may be sealed to the plate as by means of vacuum wax 71.

Provision is made for allowing the rod 65 to be raised or lowered, such as by a gland 72 in which said rod slides air-tight. Said gland is desirably resiliently mounted with respect to the extension 64, as by means of a rubber or resilient tube 73, the lower end of which is connected to the extension by means of clamp 74, and the upper end of which is connected to the gland 72 by means of clamp 75. The rod 65 is desirably provided with an operating handle 76.

The lower end of the rod 65 supports a tray, holder, or cage 77 which may serve for supporting objects formed of zirconium or titanium 80 while the same are being purified, as by treatment in the vapor of calcium 78. Such metal may be heated in the crucible 68 as by means of high frequency coil 79. Said rod 65 may be pushed down to lower the holder 77 into the molten calcium for treatment, of the rare metal therein and after sufficient treatment the same may be raised to bring the rare metal above the surface of the molten calcium.

As an alternative, the apparatus of Fig. 7 may be used for the purification of calcium with respect to nitrogen as by supporting scrap zirconium or titanium on the holder 77 and, after melting the calcium to be purified, lower it below the surface of said melted calcium, whereupon the zirconium absorbs undesired gases from the calcium to purify the same.

In Fig. 8 there is shown apparatus similar to that of Fig. 7, and in fact the upper part of the bell jar 63ᵃ and associated apparatus is identical with that of Fig. 7 and is represented in Fig. 9. In this case, however, instead of employing a crucible with an imperforate bottom, we employ one designated 68ᵃ which is of material like that of the crucible 68 but apertured as indicated at 81 and normally closed by a plug 82 at the bottom of rod 65ᵃ, the upper portion of which is provided with a handle which is indicated at 76 in Fig. 9. In the present case, the crucible 68ᵃ is charged with a quantity of calcium 78ᵃ and pieces of or scrap zirconium or titanium 80ᵃ. The charge is then melted, in inert gas in the bell jar 63ᵃ as by operation of the high frequency coil 79ᵃ and, after said molten charge has received sufficient purifying treatment by contact with the scrap rare metal, the rod 65ᵃ is raised, allowing the molten calcium to drain off to be chill cast in the supporting container 83 therebelow, the latter being formed of material like that of the crucible 68ᵃ and supported on a refractory insulative member 84, which in turn rests on a cooling plate 61ᵃ.

From the foregoing disclosure, it will be seen that we have devised an improved method for producing zirconium and titanium, using first magnesium or a magnesium-rich alloy and then calcium or a calcium-rich alloy, whereby the more expensive reduction material, calcium, is conserved, while at the same time a purer product is produced because of the greater purity of magnesium as compared with calcium. We have also shown how to purify calcium, whereby contamination therefrom, when used as a reducing agent, is decreased. The aforedesired method is adaptable to large scale production, wherein iron contamination is avoided, even though an iron crucible or container is employed, by lining it with calcium oxide or magnesium oxide.

A further improvement resides in the compacting of the charge by hydraulic pressure, is effecting the first reduction, while pelleting the material, in effecting the second reduction. The powdered product, after being compressed and sintered to coherent form, may be further treated to remove oxygen by soaking in molten or vaporized calcium. Also, the calcium employed for such soaking operation or other purpose may be previously purified, to also remove nitrogen, by melting with scrap zirconium or titanium. Such oxygen removal depends basicly on the mobility at elevated temperatures of absorbed substances in metals. When solid metals are treated by contact with a reducing agent capable of, for example, decreasing the amount of surface oxide with the formation of stable end products, the equilibrium is disturbed, promoting the almost complete removal of such contamination under the law of mass action. This idea, specifically described for zirconium and titanium, has general application to a number of other metals, such as vanadium, hafnium, and other metals, whose oxides are reducible by, but the reduced metal does not alloy with, the alkaline earth metals and alloys in which such metals are the active ingredients, at temperature at which gas diffusion in the metal is rapid. Although the method has been described using calcium, similar reducing materials, such as other alkaline earth metals and alloys in which such metals are the active ingredients, and which do not react with the metal to be purified, may be employed.

Although preferred embodiments of our invention have been described, it will be understood that modifications may be made within the spirit and scope of the appended claims.

We claim:

1. The method of producing metal selected from the group consisting of zirconium and titanium, comprising mixing an oxide of the selected metal with reducing material selected from the group consisting of magnesium metal and alloys thereof with calcium, in the proportion of not more than 18% of calcium, which materials are substantially nitrogen-free, using the selected reducing material in excess of that theoretically needed to effect complete reduction, heating the reducing material in inert gas to a temperature between 1000° C. and 1100° C., for a period of time sufficient to melt the reducing material, to cause it to react with said oxide to effect a partial reduction, cooling the mixture, leaching, drying the partially reduced oxide, mixing it with reducing material selected from the group consisting of calcium metal and alloys thereof with magnesium in the proportion of not more than 21½% of magnesium, which materials contain approximately 0.017% nitrogen and are therefore more contaminated by nitrogen than the first-mentioned reducing materials, using the selected reducing material in excess of that theoretically needed to effect complete reduction, heating the reducing material in inert gas to a temperature between 1000° C. and 1100° C., for a period of time sufficient to melt the reducing material, to cause it to react with the partially reduced oxide and liberate the selected metal in powdered form, cooling the mixture, leaching, and drying the separated powdered metal, whereby use is first made of the cheaper and weaker first-mentioned reducing material, which is freer from nitrogen, prior to using the second-mentioned more expensive, stronger, but less pure as to nitrogen material, so that the resulting product is not only cheaper but purer as to nitrogen contamination.

2. The method of producing zirconium metal comprising mixing an oxide thereof with reducing material selected from the group consisting of magnesium metal and alloys thereof with calcium, in the proportion of not more than 18% of calcium, which materials are substantially nitrogen-free, using the selected reducing material in excess of that theoretically needed to effect complete reduction, heating the reducing material in inert gas to a temperature between 1000° C. and 1100° C., for a period of time sufficient to melt the reducing material, to cause it to react with said oxide to effect a partial reduction, cooling the mixture, leaching, drying the partially reduced oxide, mixing it with reducing material selected from the group consisting of calcium metal and alloys thereof with magnesium in the proportion of not more than 21½% of magnesium, which materials contain approximately 0.017% nitrogen and are therefore more contaminated by nitrogen than the first-mentioned reducing materials, using the selected reducing material in excess of that theoretically needed to effect complete reduction, heating the reducing material in inert gas to a temperature between 1000° C. and 1100° C., for a period of time sufficient to melt the reducing material, to cause it to react with the partially reduced oxide and liberate zirconium in powdered form, cooling the mixture, leaching, and drying the separated powdered zirconium whereby use is first made of the cheaper and weaker first-mentioned reducing material which is freer from nitrogen, prior to using the second mentioned more expensive, stronger, but less pure as to nitrogen material, so that the resulting product is not only cheaper but purer as to nitrogen contamination.

3. The method of producing titanium metal comprising mixing an oxide thereof with reducing material selected from the group consisting of magnesium metal and alloys thereof with calcium, in the proportion of not more than 18% of calcium, which materials are substantially nitrogen-free, using the selected reducing material in excess of that theoretically needed to effect complete reduction, heating the reducing material in inert gas to a temperature between 1000° C. and 1100° C., for a period of time sufficient to melt the reducing material, to cause it to react with said oxide to effect a partial reduction, cooling the mixture, leaching, drying the partially reduced oxide, mixing it with reducing material selected from the group consisting of calcium metal and alloys thereof with magnesium in the proportion of not more than 21½% of magnesium, which materials contain approximately 0.017% nitrogen and are therefore more contaminated by nitrogen than the first-mentioned reducing materials, using the selected reducing material in excess of that theoretically needed to effect complete reduction, heating the reducing material in inert gas to a temperature between 1000° C. and 1100° C., for a period of time sufficient to melt the reducing material, to cause it to react with the partially reduced oxide and liberate titanium in powdered form, cooling the mixture, leaching, and drying the separated powdered titanium whereby use is first made of the cheaper and weaker, first-mentioned reducing material which is freer from nitrogen, prior to using the second mentioned more expensive, stronger, but less pure as to nitrogen material, so that the resulting product is not only cheaper but purer as to nitrogen contamination.

4. The method of producing metal selected from the group consisting of zirconium and titanium, comprising mixing an oxide of the selected metal with substantially nitrogen-free magnesium metal, in excess of that theoretically needed to effect complete reduction, heating the magnesium in inert gas to a temperature between 1000° C., and 1100° C. for a period of time sufficient to melt the magnesium to cause it to react with said oxide to effect a partial reduction, cooling the mixture, leaching, drying the partially reduced oxide, mixing it with calcium metal, which contains approximately 0.02% nitrogen and is therefore more contaminated by nitrogen than magnesium, in excess of that theoretically needed to effect complete reduction, heating the calcium in inert gas to a temperature between 1000° C. and 1100° C. for a period of time sufficient to melt the calcium to cause it to react with the partially reduced oxide and liberate the selected metal in powdered form, cooling the mixture, leaching, and drying the separated powdered metal, whereby use is first made of the cheaper and weaker magnesium which is freer from nitrogen, prior to using the more expensive, stronger, but less pure as a nitrogen material, so that the resulting product is not only cheaper but purer as to nitrogen contamination.

5. The method of producing metal selected from the group consisting of zirconium and titanium comprising mixing an oxide of the selected metal with a substantially nitrogen-free eutectic consisting of about 82% magnesium metal and about 18% calcium metal, in excess of that theoretically needed to effect complete reduction, heating the eutectic in inert gas to a temperature between 1000° C. and 1100° C., for a period of time sufficient to melt the eutectic, to cause it to react with said oxide to effect a partial reduction, cooling the mixture, leaching, drying the partially reduced oxide, mixing it with a eutectic consisting of about 79½% calcium and about 21½% magnesium, which contains approximately 0.017% nitrogen and is therefore more contaminated by nitrogen than the first-mentioned eutectic, in excess of that theoretically needed to effect complete reduction, heating the eutectic in inert gas to a temperature between 1000° C. and 1100° C., for a period of time sufficient to melt the eutectic, to cause it to react with the partially reduced oxide and liberate the selected metal in powdered form, cooling the mixture, leaching, and drying the separated powdered metal whereby use is made of the cheaper and weaker eutectic which is freer from nitrogen, prior to using the more expensive, stronger, but less pure as to nitrogen eutectic so that the resulting product is not only cheaper but purer as to nitrogen contamination.

6. The method of producing metal selected from the group consisting of zirconium and titanium, comprising mixing an oxide of the selected metal with reducing material selected from the group consisting of magnesium metal and alloys thereof with calcium, in the proportion of not more than 18% of calcium and dehydrated calcium chloride, which materials are substantially nitrogen-free, using the selected reducing material in excess of that theoretically needed to effect complete reduction, placing the mixture in an iron cup lined with inert material and surrounded by inert gas, heating the cup and contents to a temperature between 1000° C. and 1100° C., for a period of time sufficient to melt the reducing material, to cause it to react with said oxide to effect a partial reduction, cooling the mixture, leaching, drying the partially reduced oxide, mixing it with reducing material selected from the group consisting of calcium metal and alloys thereof with magnesium in the proportion of not more than 21½% of magnesium, which materials contain approximately 0.017% nitrogen and are therefore more contaminated by nitrogen than the first-mentioned reducing materials, using the selected reducing material in excess of that theoretically needed to effect complete reduction, heating the reducing material in inert gas to a temperature between 1000° C. and 1100° C., for a period of time sufficient to melt the reducing material, to cause it to react with the partially reduced oxide and liberate the selected metal in powdered form, cooling the mixture, leaching and drying the separated powdered metal, whereby use is made of the cheaper and weaker first-mentioned reducing material which is freer from nitrogen, prior to using the second mentioned more expensive, stronger, but less pure as to nitrogen material, so that the resulting product is not only cheaper but purer as to nitrogen contamination.

7. The method of producing metal selected from the group consisting of zirconium and titanium, comprising mixing an oxide of the selected metal with reducing material selected from the group consisting of magnesium metal and alloys thereof with calcium, in the proportion of not more than 18% of calcium, which materials are substantially nitrogen-free, using the selected reducing material in excess of that theoretically needed to effect complete reduction, compacting said mixture so that it occupies considerably less volume than when loose, heating the reducing material in inert gas to a temperature between 1000° C. and 1100° C., for a period of time sufficient to melt the reducing material, to cause it to react with said oxide to effect a partial reduction, cooling the mixture, leaching, drying the partially reduced oxide, mixing it with reducing material selected from the group consisting of calcium metal and alloys thereof with magnesium in the proportion of not more than 21½% of magnesium, which materials contain approximately 0.017% nitrogen and are therefore more contaminated by nitrogen than the first-mentioned reducing materials, using the selected reducing material in excess of that theoretically needed to effect complete reduction, pelleting said mixture, heating the reducing material in inert gas to a temperature between 1000° C. and 1100° C., for a period of time sufficient to melt the reducing material, to cause it to react with the partially reduced oxide and liberate the selected metal in powdered form, cooling the mixture, leaching and drying the separated powdered metal, whereby use is made of the cheaper and weaker first-mentioned reducing material which is freer from nitrogen, prior to using the second mentioned more expensive, stronger, but less pure as to nitrogen material, so that the resulting product is not only cheaper but purer as to nitrogen contamination.

References Cited in the file of this patent

UNITED STATES PATENTS

| Number | Name | Date |
|---|---|---|
| 648,439 | Rossi | May 1, 1900 |
| 1,533,505 | Lubowosky | Apr. 14, 1925 |
| 1,659,209 | Marden | Feb. 14, 1928 |
| 1,738,669 | Rich | Dec. 10, 1929 |
| 1,814,073 | Bakken | July 14, 1931 |
| 1,814,719 | Marden et al. | July 14, 1931 |
| 1,847,555 | Frary | Mar. 1, 1932 |
| 2,425,705 | Tetu | Aug. 12, 1947 |
| 2,446,062 | Rentschler et al. | July 27, 1948 |
| 2,482,127 | Schlechten | Sept. 20, 1949 |
| 2,537,068 | Lilliendahl et al. | Jan. 9, 1951 |
| 2,546,320 | Rostron | Mar. 27, 1951 |
| 2,551,341 | Scheer et al. | May 1, 1951 |
| 2,564,337 | Maddex | Aug. 14, 1951 |

FOREIGN PATENTS

| Number | Country | Date |
|---|---|---|
| 230,865 | Great Britain | Dec. 10, 1925 |
| 253,161 | Great Britain | June 7, 1926 |
| 358,531 | Great Britain | Oct. 8, 1931 |

OTHER REFERENCES

The Electrochemical Society, Preprint 78–11, October 7, 1940. Entire article 12 pages. Pages 162–163 relied upon.

Chemical Abstracts, 1948, vol. 42, page 7187.